March 5, 1963 — J. A. KELLEY ET AL — 3,080,136
PNEUMATIC ARTICLE CARRIER
Filed Oct. 2, 1958 — 5 Sheets-Sheet 4

JOHN A. KELLEY.
WILLIAM C. ZEHNPFENNIG.
INVENTORS.

BY
ATTORNEY

United States Patent Office 3,080,136
Patented Mar. 5, 1963

3,080,136
PNEUMATIC ARTICLE CARRIER
John A. Kelley and William C. Zehnpfennig, Michigan City, Ind.; said Zehnpfennig assignor to said John A. Kelley, Michigan City, Ind.
Filed Oct. 2, 1958, Ser. No. 764,878
14 Claims. (Cl. 243—34)

This invention relates to improvements in pneumatic article carriers, and more particularly to a pneumatic article carrier usable for banking functions conducted between a customer at an outdoor station remote from a bank building and a bank teller located within a bank building.

The primary object of this invention is to provide a novel, simple pneumatic article carrier whose operation can be controlled at one station with respect to the opening and closing of the unit to permit withdrawal from and insertion in the unit of articles to be transmitted to a second station, and control of direction of travel between stations.

A further object is to provide a pneumatic article carrier of captive nature with novel means for opening the same to receive articles therein and permit withdrawal of articles therefrom.

A further object is to provide a system of this character wherein the article carrier is captive and is provided with a pair of opposed lateral closures selectively operable to permit one thereof to be operated at each of two opposed ends of the system so that the carrier is always normal to the station at which it is located.

A further object is to provide a device of this character having a novel control for a pneumatic article carrier conditioned to effect sequential operation for opening and closing thereof at a station and for traverse between stations in response to a remote actuator and to sequencing means located at each station and partly located upon the carrier per se and shiftable therewith.

A further object is to provide a pneumatic article carrier system in which the carrier is captive to travel only between two stations in response to differential air pressure, said carrier traveling in one direction in response to the difference between an atmospheric pressure and a suction condition and being urged in the opposite direction in response to the difference between atmospheric pressure and a positive pressure, and wherein means operated by the position of the carrier in the system determine the nature of pressure condition to be effected upon each actuation of the system.

A further object is to provide a device of this character wherein a carrier travels in a tube terminating in substantially upright end portions in which the carrier unit is held in selected position for opening and closing thereof for the withdrawal of and acceptance of articles carried therein.

Other objects will be apparent from the following specification.

Figure 1:
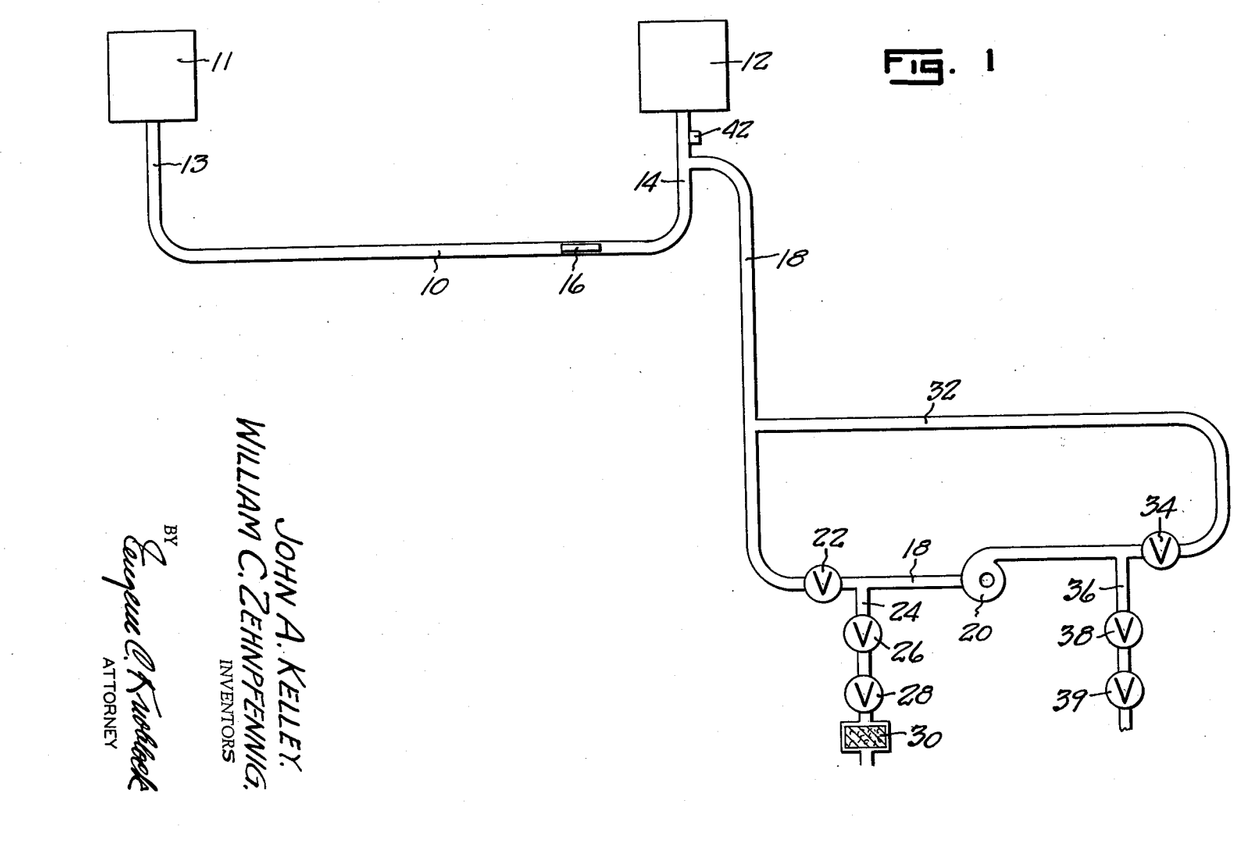
FIG. 1 is a schematic diagram illustrating the pneumatic system.

Referring to the drawings, and particularly to FIG. 1, the numeral 10 designates a tube extending between two stations 11 and 12, with its end portions 13 and 14 substantially upright and extending downwardly from those stations and with its intermediate portion preferably at a level below the level of the stations 11 and 12. The stations 11 and 12 may be located at a distance from each other, and in one form of the invention intended for use by banks in order to provide curb service or remote station service to customers, one of the stations, such as station 11, may be located out of doors while the other station, such as the station 12, may be located within the bank building. At each station there will preferably be provided a suitable housing for the operating structure into which the end portions 13 and 14 of the tube extend. The exterior station may constitute a kiosk, building or housing having a television receiver and a television transmitter or camera focused upon a space adjacent the housing and alongside an opening at which a user has access to the carrier. Thus a user standing in a position to use the device is viewed by the television camera therein, and at the same time can view a television receiving screen associated with a transmitter or camera at station 12 focused upon the teller or other operator of the system. The teller has a television receiver or screen in his view so that he can view the customer.

An article carrier 16 is captive within the tube 10, 13, 14 and travels between stations 11 and 12. A conduit 18 branches from the upright tube at part 14 spaced below the station 12 and intermediate the height of the tube part 14. Conduit 18 extends to a suitable blower 20 and has a valve 22 interposed therein. A conduit 24 branches from the conduit 18 between the valve 22 and the blower 20 and has valves 26 and 28 interposed therein and also has a screen or filter 30 preferably positioned therein adjacent the inlet thereof. A conduit 32 branches from the conduit 18 between its connection with the tube 14 and the valve 22 and extends to the outlet of the blower 20. A valve 34 is interposed in the conduit 32 between the conduit 18 and the blower 20. A conduit 36 branches from the conduit 32 between the blower 20 and the valve 34 and has valves 38 and 39 interposed therein. Valves 28 and 39 are set manually and constitute flow regulating valves. Valves 22, 26, 34 and 38 are preferably solenoid actuated valves operable by remote control.

The blower 20 is preferably of the type which may operate continuously, and the controls therefor are so adjusted that it operates at a neutral or no-load condition at all times except when the carrier 16 is traveling between stations. In the neutral position the blower is shut off from communication with the tube 10 by the valves 22 and 34.

When it is desired to propel the carrier 16 from station 12 to station 11, the carrier 16 is released from the station 12 to move through the portion 14 of the tube 10 by gravity. Suitable controls, described hereinafter, open the valves 26 and 34 and close the valve 38 so that air may enter conduit 24 through the filter 30 and flow past the regulating valve 28 and the valve 26 to the blower 20 for discharge through line 32, past valve 34, to line 18, and thence to the tube part 14 after the carrier 16 has passed by gravity the junction of the conduits 14 and 18. Air pressure forces the carrier 16 through the conduit 10 and up the conduit portion 13 to the station 11.

When the carrier 16 is to be returned from station 11 to station 12, suitable controls are operated to adjust the valves for the purpose of closing the valves 26 and 34 and opening the valves 22 and 38 so that air is evacuated from the tubes 10 and 18 by the blower 20 and discharged through the branch tube 36. This action draws the carrier 16 through the tube 10, from station 11 toward station 12. The junction of the tubes 14 and 18 will be at a sufficient elevation so that upward movement by the carrier 16 above said junction may continue by virtue of the momentum of the carrier, to insure that it reaches its destination at station 12.

The carrier 16 is preferably of the construction best illustrated in FIGS. 4, 5, 6 and 7. The carrier has two end members 44 which preferably are padded and whose shape is similar and preferably substantially oval, as shown, to provide a snug sliding fit within the tube 10 which preferably is of oval cross-section to be continuously contacted by the end members 44. Each end member preferably has a reduced dimension part 46 from which projects marginally a gasket member 48 of flexible sheet material whose outer dimension is preferably slightly greater than the inner transverse dimension of the tube 10 so as to provide a positive seal between the gasket and the tube. The end members 44 are positioned in spaced parallel relation and are interconnected by side walls 50. Each side wall has a notch 52 adjacent one end thereof, and a notch 54 intermediate the length thereof. The notches 52 and 54 are formed in opposite relation. Thus, the notch 52 in the opposite side 50 will occur in the upper righthand corner, and the notch 54 will be formed in the lefthand edge of the opposite side 50, as viewed in FIG. 6.

Figure 4:
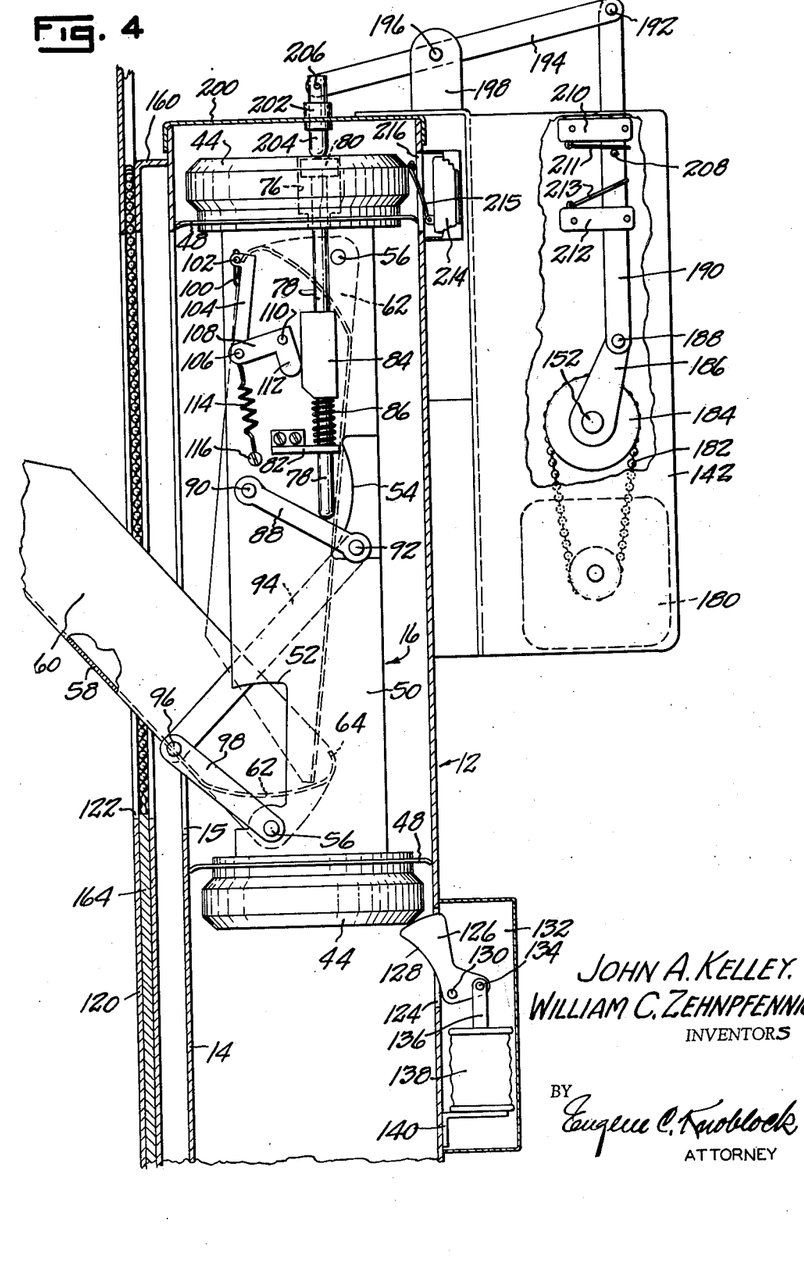
FIG. 4 is a vertical sectional view of a station of the device, illustrating the container or carrier in open position.
Figure 5:
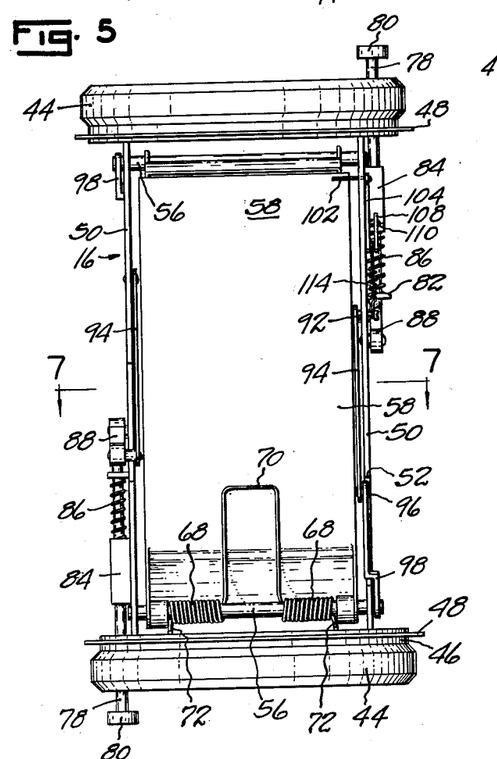
FIG. 5 is a face view of a carrier unit.
Figure 7:
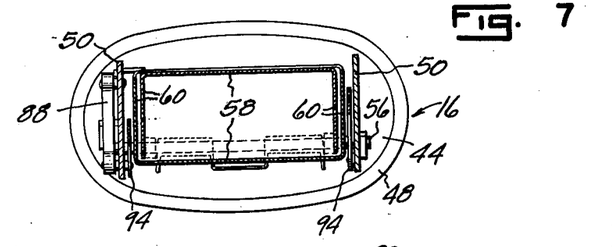
FIG. 7 is a sectional view of a carrier unit taken on line 7—7 of FIG. 5.

A shaft 56 is journaled between side walls 50 in adjacent outwardly spaced relation to each notch 52. Each shaft mounts one end of a tray to swing said tray between a closed position, as illustrated in FIGS. 5 and 7, within the confines of the space between the end members 44, and a tilted or open position as illustrated in FIG. 4, upon rocking of said shaft. Each tray is of substantially U-shape in cross-section, as best seen in FIG. 7, having a back panel 58 and a pair of spaced side panels 60. The back panel merges with an end panel 62 at one end thereof, said end panel 62 preferably being curved and terminating inwardly from the ends of the adjacent side panels 60 at which the tray is anchored to the shaft 56. Each end wall 62 preferably terminates in a return bent lip 64. The opposite end of each side wall is preferably cut away diagonally at 66. The side walls 60 of one tray section are spaced apart a distance greater than the side walls of the other tray section, so that the tray sections interfit, as best seen in FIG. 7. The arrangement is such that in the normal position the two trays completely enclose an article-receiving space. The trays are urged to closed position by springs having coiled end sections 68 encircling a shaft, an intermediate offset section 70 bearing against tray panel 58, and terminal portions 72 bearing against end member 44.

Each of the end members 44 has an opening 76 therein outwardly of the adjacent side wall 50 of the carrier through which extends a plunger member 78 which may have an enlarged head 80 at the end thereof. The plunger 78 is shiftable in guide member or members 82 carried by the adjacent wall 50. A cam abutment 84 is mounted on the plunger 78 intermediate the length thereof, and a coil spring 86 encircles the plunger 78 bearing at its opposite ends on the guide 82 and the cam projection 84. A lever 88 is pivoted at 90 to a carrier wall 50 and in turn is pivotally connected at 92 to a link member 94 which in turn is pivotally connected at 96 to an arm 98 fixed upon an end of the shaft 56 remote from the head or end member 44 of the carrier through which the plunger 78 projects. A similar arrangement is located at each side of the carrier, with the plungers 78 projecting from opposite end members 44. Thus it will be apparent that when one of the plungers 78 is depressed against the action of the spring 86, the lever 88 is swung from the FIG. 6 position to the FIG. 4 position whereupon the link 94 moves bodily to swing the arm 98 to a position to open the tray mounted upon the shaft 56 with which the arm 98 so swung is associated. Likewise, upon release of the plunger 78 the spring 68—70 will return the tilted tray from FIG. 4 position to FIG. 6 position, and the spring 86 will return the plunger 78 from FIG. 4 position to FIG. 6 position.

Each carrier side wall 50 has a longitudinally elongated slot 100 formed therein in laterally spaced relation to the adjacent shaft 56. Each slot 100 receives a pin 102 mounted on a link 104 pivoted at 106 to one arm of a bellcrank 108 which is pivoted at 110 to the container wall 50. The opposite leg 112 of the bellcrank projects into the path of the cam projection 84 on the plunger 78 therebelow. A coil spring 114 is connected at the pivot 106 and is connected at 116 to the container side wall 50 to serve to normally urge the pin-carrying link 104 and associated parts to the position shown in FIG. 6, wherein the pin 102 is located at the inner end of the slot 100 and in a position to lap the free end of the wall 58 of the adjacent tray. It will be apparent that as the plunger 78 is depressed the cam projection 84 swings the bellcrank lever 108 clockwise to shift the link 104 toward the adjacent end member 44, whereby the pin 102 is carried toward the end of the slot 100 adjacent to the end member 44, as illustrated in FIG. 4. In this position the pin 102 is clear of the free end of the adjacent tray to permit pivoting of that tray against the action of the spring 68. The parts will preferably be so proportioned that the pin 102 will move clear of the tray wall 58 before the lever 88, link 94 and arm 98 are moved to start to open the tray. It will be observed that the latter movement of the parts 88, 94 and 98 is accommodated by the shape of the notches 54 and 52, which arrangement permits positioning of the link 94 between the container wall 50 and the tray while the lever 88 and the arm 98 are positioned outwardly of the container wall at least at the pivotally mounted end thereof.

The tube end portions 13 and 14 extend into a housing having a wall portion 120 with an access opening 122. For purposes of illustration the tube end portion 14 is referred to in FIGS. 2, 3 and 4, but it will be understood that similar arrangements are made with respect to the tube end portion 13. The tube end portion 14 extends adjacent to and parallel to the wall 120 and has an opening 15 therein which registers with the housing wall opening 122, and it will further be understood that both of the openings 15 and 122 will be of a width to accommodate passage therethrough of a tray to an outward tilted position as illustrated in FIG. 4. Each of the tube ends 13 and 14 has a slot 124 therein at the wall thereof opposite the wall in which the opening 15 is formed and preferably at a level spaced below the level of the bottom of the opening 15, as best seen in FIG. 4. A locking dog 126 has a cam edge 128 in a portion thereof projecting through the slot 124 and facing inwardly with reference to the tube. The dog 126 is pivoted at 130 to a suitable housing or bracket 132. The dog 126 is pivoted at 134 to the plunger 136 of a solenoid 138 supported upon bracket 140. The dog 126 will preferably be spring-urged to a position as illustrated in FIG. 4, projecting into the tube 14 and providing a support for a carrier 16, as illustrated in FIG. 4, when said carrier is located in discharging and charging position at a terminal or station.

A bracket 142 is secured by each upright tube portion or positioned alongside the same at the side thereof opposite that in which the opening 15 is formed. A reversible electric motor 144 is mounted on the bracket 142 and mounts a drive pulley 146 around which is trained a drive transmission member, such as a bead chain 148, in turn trained around a pulley 150 mounted upon a shaft 152 whose opposite ends are journaled in the bracket 142. A pair of pulleys 154 are mounted upon the opposite ends of shaft 52 preferably outwardly of the bracket 142. A drive transmission member, such as a bead chain 156, is trained around each of the sprockets 154. One end portion of this bead chain extends alongside the tube and is trained around a sprocket 158 journaled upon a bracket structure 160 interposed between the upper portion of the tube 14 and the casing wall 120. A sprocket 162 is mounted upon the front of the bracket 160 at the upper end thereof and has the chain 156 trained therearound and thence directed downwardly for connection with a door or closure member 164 slidable vertically between guide members 166 interposed between the front 120 of the housing and the front of the bracket 160. It will be understood that the bracket 160 has an opening therein registering with the wall opening 122 so that the closure or door 164 is the only element interposed between the opening 15 in the tube 14 and the exterior of the housing structure of which the member 120 forms a part. The opposite end of each chain portion 156 extends forwardly and downwardly and is trained around a sprocket 167 rotatably mounted upon the side of the bracket 160 at the lower portion thereof, thence the chain portion is trained around a lower sprocket 168 mounted upon the bracket 160 at the front face thereof. From the sprocket 168 the chain 156 extends to and is connected with the lower end portion of the closure 164. It will be apparent therefore that upon operation of the motor 144 in one direction, for example, in a direction to rotate the sprockets 154 clockwise as viewed in FIG. 2, the door 164 will be lowered from its position shown in FIG. 3 to the position shown in FIG. 4, while the opposite direction of rotation of motor 144 will elevate the closure from open to closed position. It will further be apparent that since two chain units 156 are employed, connected at opposite sides of the closure 164 and driven from a common operating shaft 152, a smooth and trouble-free operation of the closure 154 will result.

The closure 164 carries a lateral projection 170 which is shiftable freely in a vertical slot 172 in the bracket 160. A limit switch 174 is carried by the bracket 160 and has an actuating portion 175 positioned to be engaged and actuated by the member 170 when the closure is at its uppermost or closed position. A limit switch 176 is carried by the bracket 160 and is provided with an actuator 177 positioned in the path of and engageable by the member 170 at the lower limit of travel of the closure 164.

Bracket 142 also mounts a reversible motor 180 having a sprocket mounted upon its shaft, around which is trained a bead chain 182 or other drive transmission means which is in turn trained around a sprocket 184 journaled relative to the bracket 142. In the construction shown sprocket 184 is rotatably mounted upon the shaft 152. An arm 186 is mounted upon and projects from the sprocket 184 and is pivotally connected at 188 to a link 190 which extends substantially vertically. The opposite end of link 190 is pivoted at 192 to one end of a lever 194 pivoted at 196 intermediate its ends upon a bracket 198 projecting upwardly from an upward projection of bracket 160 at a level above a top plate 200 mounted upon the upper end of tube 14. The top plate 200 has an opening therein receiving a guide sleeve 202 aligned with the recess 76 in the carrier end member when said member is positioned in said station as illustrated in FIG. 4. A plunger 204 is pivoted at 206 to the end of the lever 194 remote from the pivot connection thereof with the link 190. The arrangement is such that operation of the motor 180 in a direction to rotate sprocket 184 and the projecting arm 186 clockwise, as viewed in FIG. 2, will urge the plunger 204 downwardly into contact with the head 80 upon the carrier plunger 78 for the purpose of actuating the link and lever mechanism 88, 94, 98 for the purpose of tilting a tray positioned adjacent to the housing opening 122 through that opening, as viewed in FIG. 4. Reverse rotation of the motor 180 will elevate the plunger 204 to permit the carrier plunger 78 to return to its normal elevated position by spring action as described above for the purpose of closing the carrier.

The link 190 has a pin 208 projecting therefrom. A limit switch 210 is carried by the bracket 142 and has an actuator 211 engageable by the pin 208 as the link 190 approaches the upper limit of its movement. A limit switch 212 has an actuator 213 also positioned in the path of the pin 208 as the link 190 approaches the lower end of its movement. The vertical spacing of the switches 210 and 212 will be arranged in accord with the desired stroke of the link 190 and the plunger 204.

A limit switch 214 is suitably mounted upon the upper end of the tube 14 or adjacent thereto and has an actuator 215 extending through an opening 216 in the tube 14 to be engaged and actuated by the upper container end member 44 when in its operative position, as illustrated in FIG. 4.

The electrical circuit of the device associated with each of the stations 11 and 12 is substantially the same. In view of this similarity of the circuits at the two stations, only the circuits for the control station 12 will be shown. It will be understood, of course, that the circuit at the opposite station 11 will respond to certain control elements, such as push buttons, which may be located thereat or at the control station 12. Likewise, the circuit at the station 11 will not include the switch 42 shown in FIG. 1.

Figure 8:
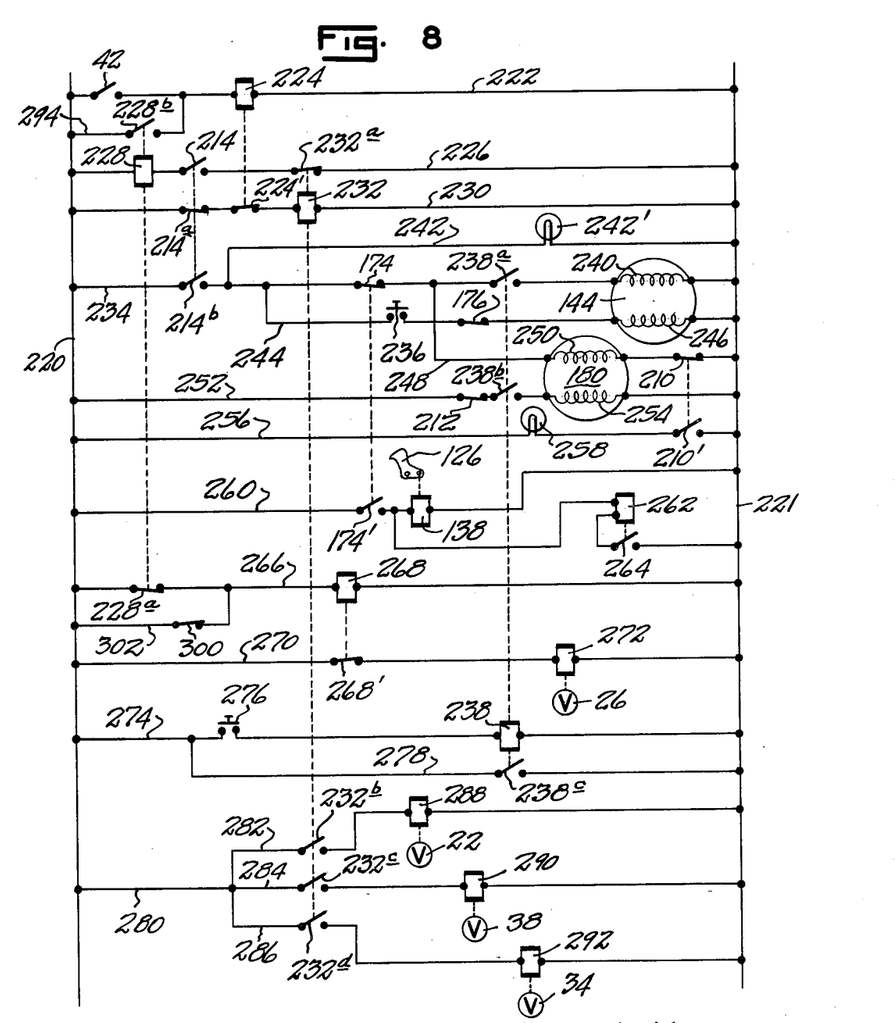
FIG. 8 is an electrical wiring diagram of the system.

In the circuit shown in FIG. 8, the lines 220 and 221 constitute power lines. A conductor 222 connected across the lines 220 and 221 has a switch 42 interposed therein and also has interposed the coil 224 of a relay. A conductor 226 is interposed across the lines 220, 221 and has interposed therein the coil 228 of a relay and one blade or contact 214 of a limit switch which normally is biased to open position. A conductor 230 is connected across the lines 220, 221 and has connected therein coil 232 of a relay. Also interposed in the conductor 230 is the normally open switch 224' controlled by the relay coil 224 and forming a part of the relay, and a normally open switch 214a associated with and movable with the switch 214.

A conductor 234 is connected with line 220 and has interposed therein normally open switch 214b associated and movable with the switch 214, a normally closed switch 174, a normally open switch 238a and one winding 240 of the reversible motor 144. A conductor 242 branches from conductor 234 and is connected to line 221. Conductor 242 is so connected to conductor 234 as to permit current to flow therein when switch 214b is closed, and includes therein a signal, such as an incandescent lamp 242, which indicates the closed condition of the switch 214b. A conductor 244 branches from the conductor 234 and extends to the power line 221. Conductor 244 branches from conductor 234 at a position to permit current flow therein when switches 214b and a normally open push button switch 236 are closed. Conductor 244 has interposed therein the normally closed switch 176 and the winding 246 of the motor 144.

A conductor 248 branches from the conductor 234 and leads to the line 221. Conductor 248 is connected to conductor 234 at a point to permit current flow therein when switches 214b, 236 and 174 are closed. One winding 250 of motor 180 is interposed in the conductor 248, as is the normally closed contact of switch 210. Conductor 252 connects the lines 220, 221 and has interposed therein normally closed switch 212, normally open switch 238b, and winding 254 of the motor 180. Conductor 256 connects the lines 220, 221 and has interposed therein a signal 258, such as an incandescent lamp, and also a normally open contactor or switch 210', associated with switch 210.

A conductor 260 connects the lines 220, 221 and has interposed therein a normally open switch contact 174' associated with the normally closed switch 174 for conjoint movement therewith. Conductor 260 also has interposed therein the coil of the solenoid 138 and the coil 262 of a time-controlled or time delay relay having a normally open switch contact 264 also interposed in said conductor 260.

A conductor 266 connects the lines 220 and 221 and has interposed therein the normally closed switch 228a associated with the coil 228 and forming a part of a relay. Also interposed in conductor 226 is relay coil 268. Conductor 270 connects lines 220, 221 and has interposed therein the normally closed switch 268' of the relay 268. Also interposed in the conductor 270 is the coil 272 of a solenoid which controls the valve 26.

A conductor 274 connects the lines 220, 221 and has interposed therein a normally open push button 276 and the coil 238 of a relay. A holding circuit is associated with the relay 238 and constitutes a conductor 278 branching from the conductor 274 and having interposed therein the normally open switch contact 238c of the relay 238.

A conductor 280 is connected with line 220 and has conductors 282, 284 and 286 branching therefrom and connected to the line 221. Normally open switch 232b of relay 232 and solenoid coil 288 for actuating the valve 22 are interposed in the branch conductor 282. Normally open switch 232c of relay 232 and coil 290 of a solenoid for operating the valve 38 are interposed in conductor 284. Normally open switch 232d of relay 232 and the coil of solenoid 292 for operating the valve 34 are interposed in the branch conductor 286.

The circuit is completed by a normally closed switch 232a of the relay 232 interposed in the conductor 226 and the normally open switch 228b of relay 228 interposed in a branch conductor 294 connected to the line 220 at one end and to the conductor 222 between the switch 42 and the relay coil 224 at its opposite end.

In the operation of the device, let us assume that the carrier 16 is traveling from station 12 to station 11 propelled by air pressure generated by the blower 20 and entailing flow of air from atmosphere through branch line 24 through filter 30 and normally open valve 28, opened valve 26, conduit 18, blower 20, conduit 32, past valve 34, back to conduit 18, and thence to tube portion 14 for flow into tube part 10 and tube part 13 behind the carrier. Upon arrival of the carrier at station 11 at the upper end of tube part 13, the carrier 16 moves past the spring-urged latch 126 and strikes the end plate 200 and engages the actuator 215 of normally open switch 214 to close that switch. The carrier 16 then falls to the position illustrated in FIG. 4 resting upon the latch 126 and remains in this position. The container 16 holds switch 214 closed while in its position resting upon the latch 126, and this closes the circuit in conductor 226 across the lines 220, 221, thereby energizing the relay coil 228. As relay coil 228 is energized, switch 228a thereof in conductor 266 opens to break the circuit to the relay coil 268, thereby breaking the normally closed circuit in conductor 270 in which switch 268' of the relay 268 is connected. This serves to deenergize the solenoid 272 which has been holding open the valve 26 thus allowing that valve 26 to close as by spring action or in any other manner to close the supply of air to the blower 20. It will be understood that valve 22 is closed during the travel of carrier 16 from station 12 to station 11. Consequently, the closing of the valve 26 shuts off the supply of air to the blower 20 and thereafter the blower 20 operates under a no-load condition.

Switch contacts 214a and 214b are arranged in a gang with switch 214 to close simultaneously therewith. Hence the arrival of the carrier at station 11 is signalled to an operator at station 12 when switch contact 214b closes the circuit through conductors 234 and 242 across the lines 220, 221 to energize the signal 242' which will be located at station 12.

If or when a customer appears at station 11, to whom the operator at station 12 desires to give access to the container 16, the operator depresses push button 236 which is located at the station 12. The closing of switch 236, together with the prior closing of switch 214b closes the circuit through conductors 234 and 244 across the lines 220, 221 for the purpose of energizing the winding 246 of the motor 144 and also closes circuit through conductors 234 and 248 to energize the winding 250 of the motor 180.

Figure 2:
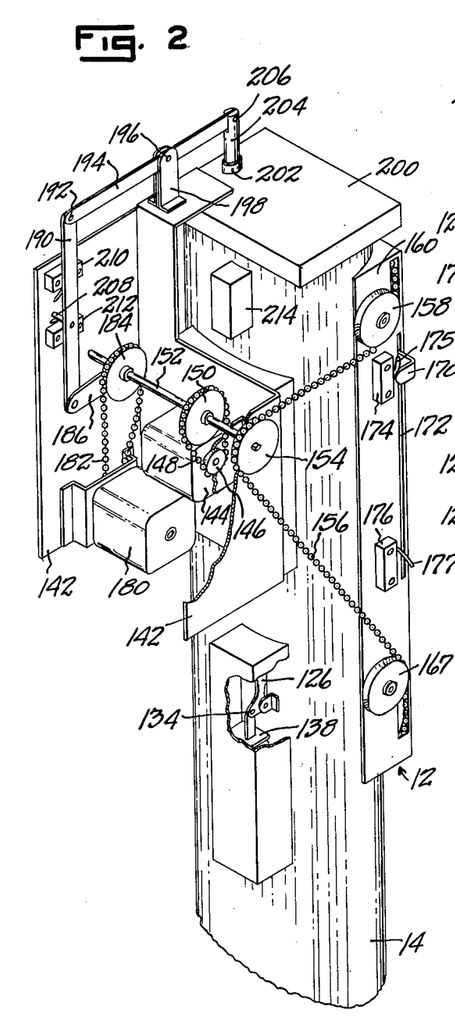
FIG. 2 is a perspective view with parts broken away, illustrating the operating mechanism at a delivery station, as viewed from the inner or concealed side thereof.
Figure 3:
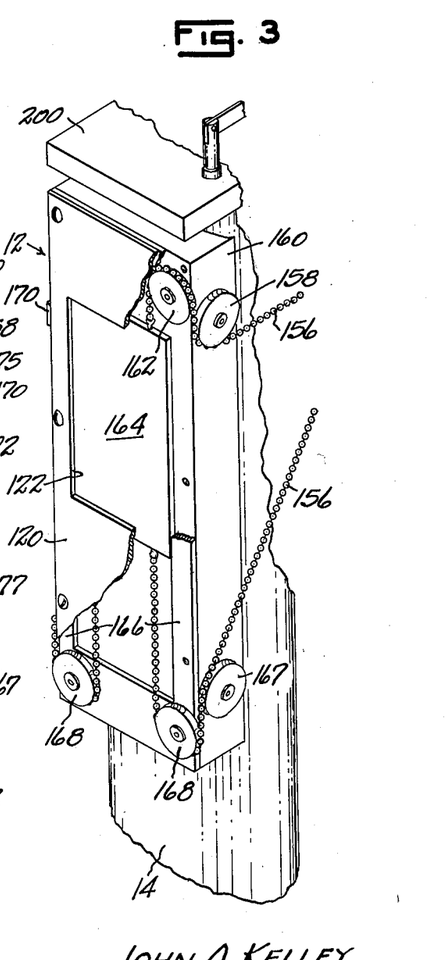
FIG. 3 is a fragmentary perspective view of the mechanism at a delivery station of the ssytem, viewed from the outer side thereof with parts being broken away.

Operation of the motor 144 by the winding 246 thereof energizes the sprockets 154 or the bead chains 156 in a clockwise direction, as viewed in FIG. 2, it being understood that closure 164 will be in its closed position illustrated in FIG. 3 normally and during the time that the container 16 has been traveling toward station 11. The bead chains 156 are actuated by the sprockets 154 to lower the closure and thereby open the access hole 122 at the station 11. Operation of the motor 144 continues until the striker projection 170 on the closure 164 engages the actuator 177 of the switch 176, thus opening the normally closed switch 176 and breaking the circuit to the motor winding 246, causing the motor 144 to stop.

Figure 6:
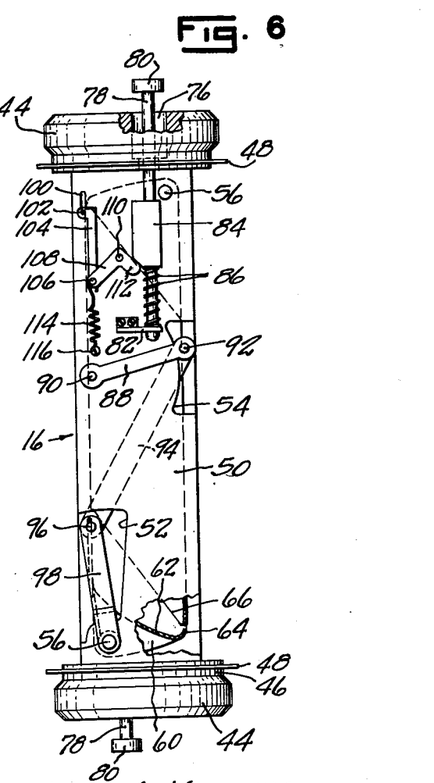
FIG. 6 is a side view of a carrier unit.

During the same time that the motor 144 is energized to open the closure 168, the motor 180 is operating in a direction controlled by the energization of the winding 250 thereof to drive the bead chain of drive transmission 182 in a clockwise direction, as viewed in FIG. 2, for the purpose of elevating link 190, rocking lever 194 clockwise as seen in FIG. 2, and lowering the plunger 204 to the position illustrated in FIG. 4 in which it has depressed the plunger 78 at the uppermost end of the carrier from its normal position illustrated in FIGS. 5 and 6 to the position illustrated in FIG. 4. Thus plunger 78 shifts the linkage consisting of parts 88, 94 and 98 connected with the lowermost carrier shaft 56 for the purpose of tilting the carrier tray mounted upon the lowermost shaft 56 and positioned closest to the housing wall 120 having the opening 122 for the purpose of projecting that tray to the position illustrated in FIG. 4. It will be understood that the arm 112 of the bellcrank lever 108 is swung clockwise upon the first increment of movement of the plunger 78 by the cam projection 84 thereof so as to elevate the link 104 and the locking pin 102 carried thereby within the slot 100 to a position clear of the free end of the wall 58 of the tray to make possible the release of the tray for tilting to the FIG. 4 position. In order for proper timing of this operation to occur, the plunger 78 will normally be positioned clear of the lever 88 so that there is a time delay between commencement of movement of the plunger 78 and the commencement of the opening of the container tray 58 which will allow actuation of the tray locking pin 102 to releasing position by operation of the bellcrank 108.

Operation of the motor 180 energized by the coil 250 thereof continues until the pin or projection 208 on the link 290 engages and trips the actuator 211 to open the normally closed switch 210 and thereby break the circuit actuating the motor coil 250. The switch 210 is a gang switch which includes a normally open switch contact 210' which is closed upon actuation of the switch actuator 211 to the position shown in FIG. 4 at the end of the plunger depressing stroke thereof, and the closing of the switch contact 210' energizes the signal 258 located at the station 12 to notify the operator at that section that both the closure 164 and the carrier 16 are open at station 11.

When the operator at station 12 desires to reclose the closure 164 and the carrier 16, push button 276 at station 12 located in conductor 274 is closed to energize the coil of the relay 238. When relay coil 238 closes one of its contacts 238c, which is normally open, closes the circuit to cause the line to lock the relay 238 in operative position. Energization to the relay coil 238 while push button switch 236 is closed closes the normally open relay switch 238a in conductor 234 to close the circuit to the winding 240 of the motor 144 and also closes the relay switch 238b in the conductor 252 for the purpose of closing the circuit to the winding 254 of the motor 180. As the motor 180 is energized by winding 254, it operates pulley 184 through the medium of the connecting drive transmission chain or member 182 in a counterclockwise direction as viewed in FIG. 2 to move the link 190 downward to rock the lever 194 counterclockwise and to elevate plunger 204. As the plunger 204 rises, the plunger 78 of the container previously depressed thereby is permitted to rise under the action of the spring 86, whereupon the spring 68, 70 associated with the opened tray of the container is permitted to swing the opened or tilted tray of FIG. 4 to a vertical position within the outline of the container, as determined by its contact with the adjacent portion of the opposite tray. The tray reaches fully closed position before the plunger 78 travels through its complete stroke and at the time that the arm 112 of the bellcrank 108 reaches the cam portion of the projection 84, following which further movement of the cam projection permits swinging of the bellcrank by its spring 114 for the purpose of actuating the linkage to lower the locking pin 102 in the slot 100 to thereupon hold or lock the tray in closed position. This action of the motor 180 continues until the striker or projection 208 engages the actuator 213 of the normally closed switch 212 to break the circuit to the winding 254 of the motor 180 and thereby deenergize that motor.

At the same time that the operation of motor 180 to close and lock the tray of the container occurs, motor 144 is energized or operated by its winding 240 to cause the sprockets 154 to rotate in a counterclockwise direction, as viewed in FIG. 2, to cause the chain or other drive transmission members 156 to pull the closure 164 upward to span the housing opening 122. This action of motor 144 continues until the striker projection 170 carried by the closure 164 engages the actuator 175 of the switch 174 to open the normally closed switch 174 in conductor 234 and thus deenergize the winding 240 and stop operation of the motor 144. The switch 174 is a gang switch, and switch part 174' thereof is closed by the operation which opens the switch 174, and the closing of the switch 174' closes a circuit across the lines to conductor 260 to energize the coil 138 of the solenoid. Energization of the coil 138 retracts the latch 126, allowing the carrier 16 to fall through the portion 13 of the tube 10 and away from the station 11 by gravity. The flow of current in conductor 260 also energizes the coil of "delay after energizing" relay 264.

It will be apparent that as the carrier 16 falls away from the position shown in FIG. 4 at station 11 it disengages or releases the actuator 215 of the switch 214, allowing the switch 214 and its associated contacts 214a and 214b to return to normal position in which contact 214a thereof assumes a closed position, while contacts 214 and 214b thereof assume open or broken circuit positions. The closing of switch 214a energizes the relay coil 232 in the conductor 230. Energization of the coil of relay 232 causes the normally open relay contacts 232b, 232c and 232d to close, thus providing current flow through branch lines 282, 284 and 286 for the purpose of energizing the solenoids 286, 290 and 292 to open the valves 22 and 38 and close the valve 34. It will be remembered that the valve 26 was closed previously. Thereupon, continued operation of the continuously operating blower 20 draws air from and produces a suction ahead of the carrier 16 in tubes 10, 14 and conduit 18, which air is discharged to atmosphere through branch tube 36. This suction action draws the carrier 16 in the tube 10 and the tube portion 14 toward station 12. The rate of travel in this direction is controlled by the setting of the valve 39 just as the setting of the valve 28 controls the rate of travel of the carrier in the opposite direction. At the present time following its energization, the "delay after energizing" relay 262, 264 operates to break the flow of current in conductor 260 at the relay switch 264, thereupon deenergizing solenoid 138 and allowing the latch 126 at the station 11 to return to its normal position in preparation for the next cycle. It will be understood that the time setting will be such that the carrier 16 will have passed clear of the latch 126 before the solenoid 138 is deenergized and it further will be understood that the latch 126 will be of the type which is spring-urged to the position shown in FIG. 4 projecting into the tube part 13 at the opening 124 thereof.

The speed of movement of the carrier 16 toward the station 12 is such that the momentum of the carrier will be sufficient to carry it into the upper portion of the tube 14 at the station 12 and into engagement with the stop 200 at station 12 after it has passed the junction of conduit 18 with tube 14. As the carrier 16 moves through the tube 14 it strikes and closes the switch 42, thus energizing the coil of the relay 224. Energization of relay 224 opens the normally closed relay switch contactor 224' in conductor 230, thus deenergizing the relay 232 to open the relay contactors 232b 232c and 232d, and to close the relay contactor 232a. Operation of the contactors 232b, 232c and 232d deenergizes the valve operating solenoids 288, 290 and 292, thus closing the valves 22 and 38 and opening the valve 34 while the valve 26 remains closed. This operation of the valves stops the flow of air in the conduit 18 and tubes 10.

At station 12 the same sequence of operation and the same procedures occur in the circuit associated with station 12 as those described above with reference to the operations occurring at station 11, and it is believed unnecessary to repeat the description of the operation at station 12, for that reason. It will be observed, however, that at station 12 the position of the carrier will be inverted and that the plunger 78 which was positioned lowermost at station 11 will then be positioned uppermost and will control the opening of the carrier at the tray thereof opposite the tray which is opened at station 11. After the attendant at station 12 has opened the carrier for processing or handling of the contents thereof, such as the making of a bank deposit or bank withdrawal or any other banking transaction where the device is used for banking purposes, and has reloaded the carrier and desires to return it to station 11, he does so by releasing the latch 126 at the station 12 so that the carrier is free to fall by gravity through part 14 of the tube, thus releasing the switch at station 12 comparable to the switch 214, such as the switch 300 in branch line 302, for the purpose of actuating solenoid 268 to control the circuit of the solenoid 272 and thereby reopen the valve 26 to permit the blower to be supplied with air discharged through conduits 32 and 18 to the tube 14 for propulsion of the carrier to station 11.

While the preferred use of the carrier for banking purposes has been mentioned herein, it will be understood that such use has been mentioned in an illustrative sense and not in a limiting sense. Furthermore, it will be understood that, while the preferred embodiment of the invention has been described and illustrated herein, changes therein may be made within the scope of the appended claims without departing from the spirit of the invention.

We claim:

1. An article carrier, comprising a pair of spaced end members, spaced side members connecting said end members to define a frame, a pair of similar tray members respectively pivoted to opposite ends of said frame and positioned between said side members in confronting opposed relation, each tray member being substantially U-shaped in transverse section and having an end portion, said tray members having their end portions positioned oppositely and cooperating to define an article compartment, each tray being pivoted adjacent its end portion and adjacent an end member, spring means normally urging said tray members toward each other to closed contacting compartment defining position and selectively operable means for swinging each tray from its closed position.

2. An article carrier comprising a rigid frame having spaced end members and a pair of spaced side members and being open at opposite sides between said side members, a pair of similar trays each having a back wall, a pair of side walls and an end wall, means pivotally mounting said trays adjacent their respective end walls in opposed relation and at opposite ends of said frame and spring means normally urging said trays into contacting interfitting position in said frame to define a closed compartment therein and selectively operable means for swinging each tray on said frame against the action of said spring means.

3. A pneumatic tube article carrier comprising a rigid frame having spaced end members and a pair of spaced side members and being open at opposite sides between said side members, a pair of similar trays each having a back wall, a pair of side walls and an end wall, means pivotally mounting said trays adjacent their respective end walls in opposed relation and at opposite ends of said frame, means normally urging said trays into contacting position in said frame to define a closed article-confining compartment, selectively operable means for swinging each tray in said frame and selectively operable releasable means for holding each tray in closed position.

4. A pneumatic tube article carrier comprising a rigid frame having spaced end members and a pair of spaced side members and being open at opposite sides between said side members, a pair of similar trays each having a back wall, a pair of side walls and an end wall, means pivotally mounting said trays adjacent their respective end walls in opposed relation and at opposite ends of said frame, means normally urging said trays into contacting position in said frame to define a closed article-confining compartment, releasable means for holding each tray in closed position, means for pivoting each tray through the adjacent open side of said frame, and a selectively operable actuator associated with each tray for sequentially releasing said holding means and actuating said tray pivoting means to open said tray and for releasing said pivoting means and actuating said holding means to reclose said tray.

5. A pneumatic tube article carrier comprising a rigid frame having spaced end members and a pair of spaced side members and being open at opposite sides thereof, a pair of closures each pivoted to said frame and cooperating to define a closed compartment, means normally urging said closures toward closed position, independent spring-urged latch means for locking said closure, independent closure operating means, and a pair of longitudinally shiftable actuators shiftably carried by said frame and projecting from opposite ends thereof at opposite sides thereof, and latch operating mechanism, each actuator actuating the latch operating mechanism and closure operating means associated with one closure in predetermined sequence.

6. A pneumatic tube article carrier comprising a rigid frame having spaced end members and a pair of spaced side members and being open at opposite sides thereof, a pair of closures respectively pivoted to opposite ends of said frame and cooperating to define a closed compartment, means normally urging said closures toward closed position contacting each other, and independent mechanism carried by said frame for selectively opening said closures, each mechanism including an endwise shiftable part projecting from an end of said frame and linkage pivoted to said frame in the path of said endwise shiftable part and operatively connected to shift the closure pivoted at the frame end opposite that from which said shiftable part projects.

7. In combination, a pneumatic carrier tube, a hollow carrier having an opening and shiftable and captive in said tube, pneumatic means for propelling said carrier in said tube in selected direction, said tube having an opening therein, means adjacent said tube opening for releasably positioning said carrier to be accessible through said opening, means for normally closing said carrier opening, and means adjacent said tube opening for actuating the carrier closing means.

8. In combination, a pneumatic carrier system including a carrier tube connecting a pair of stations, said tube having an opening at each station, a carrier shiftable and captive in said tube, pneumatic means for propelling said carrier in said tube between said stations, means for releasably positioning said carrier at each station adjacent a tube opening, a pair of normally closed opposed shiftable contacting compartment-defining closure members mounted on said carrier, and means for opening and reclosing the closure member facing said tube opening when said carrier is positioned at a station.

9. In combination, a pneumatic carrier system including a carrier tube connecting a pair of stations, said tube having an opening at each station, a carrier shiftable and captive in said tube, pneumatic means for propelling said carrier in said tube between said stations, means for releasably positioning said carrier at each station adjacent a tube opening, a pair of normally closed opposed shiftable contacting compartment-defining closure members mounted on said carrier, means for opening and re-closing the closure member facing said tube opening when said carrier is positioned at a station, each station including a housing into which said tube projects and having an opening adjacent said tube opening, a closure for said housing opening, and means for shifting said last named closure relative to said housing opening.

10. In combination, a pneumatic carrier system including a carrier tube connecting a pair of stations, said tube having an opening at each station, a carrier shiftable in said tube, pneumatic means for propelling said carrier in said tube between said stations, means for releasably positioning said carrier at each station adjacent a tube opening, a pair of normally closed opposed shiftable contacting compartment-defining closure members mounted on said carrier, means for opening and re-closing the closure member facing said tube opening when said carrier is positioned at a station, each station including a housing into which said tube projects and having an opening adjacent said tube opening, a closure for said housing opening, means for shifting said last named closure relative to said housing opening, and a control for said respective closure operating means actuating the same in predetermined sequence.

11. In combination, a pneumatic carrier system including a carrier tube connecting a pair of stations, a carrier captive and shiftable in said tube between said stations and including normally operative opposed closures, means at each station for releasably positioning said carrier, means at each station for opening a selected carrier closure for deposit of articles therein and removal of articles therefrom, and pneumatic means connected to one end portion of said tube and adapted to selectively create sub-atmospheric pressure in said tube to propel said carrier toward said tube end portion and above-atmospheric pressures in said tube to propel said carrier to the opposite end portion of said tube.

12. In combination, a pneumatic carrier system including a carrier tube connecting a pair of stations, a carrier captive and shiftable in said tube between said stations and including normally operative opposed closures, means at each station for releasably positioning said carrier, means at each station for opening a selected carrier closure for deposit of articles therein and removal of articles therefrom, pneumatic means connected to one end portion of said tube and adapted to selectively create subatmospheric pressure in said tube to draw said carrier thereto and above-atmospheric pressures in said tube to propel said carrier therefrom, and means responsive to the position of said carrier in said tube to regulate the setting of said pneumatic means.

13. In combination, a pneumatic carrier system including a carrier tube connecting a pair of stations, a carrier captive and shiftable in said tube between said stations and including normally operative opposed closures, means at each station for releasably positioning said carrier, means at each station for opening a selected carrier closure for deposit of articles therein and removal of articles therefrom, and pneumatic means connected to one end portion of said tube and adapted to selectively create sub-atmospheric pressure in said tube to draw said carrier thereto and above-atmospheric pressures in said tube to propel said carrier therefrom, said carrier tube including substantially upright end portions at whose upper ends said stations are located, said carrier being adapted to fall in said tube by gravity into spaced relation to a station upon release of said positioning means.

14. In combination, a carrier tube connecting a pair of stations, a carrier captive and shiftable in said tube between said stations and including normally operative opposed closures, means at each station for releasably positioning said carrier, means at each station for opening a selected carrier closure for deposit of articles therein and removal of articles therefrom, pneumatic means connected to one end portion of said tube and adapted to selectively create subatmospheric pressure in said tube to draw said carrier thereto and above-atmospheric pressures in said tube to propel said carrier therefrom, said carrier tube including substantially upright end portions whose upper ends communicate with said stations, said carrier being adapted to fall in said tube by gravity into spaced relation to a station upon release of said positioning means, said pneumatic means being connected to one tube end portion intermediate the height thereof, and a controller carried by said last named tube end between the connection of said pneumatic means with said tube and the adjacent station, said controller changing the setting of said pneumatic means in response to actuation thereof by said carrier when the latter moves therepast in one direction.

References Cited in the file of this patent

UNITED STATES PATENTS

| | | |
|---|---|---|
| 299,216 | Goodwin | May 27, 1884 |
| 742,390 | Burton | Oct. 27, 1903 |
| 1,039,394 | Herz | Sept. 24, 1912 |
| 1,207,988 | Olmsted | Dec. 12, 1916 |
| 1,685,276 | Doerr | Sept. 25, 1928 |
| 2,127,500 | Cross | Aug. 23, 1938 |
| 2,272,067 | Poivrel et al. | Feb. 3, 1942 |
| 2,454,361 | Wedemeyer | Nov. 23, 1948 |
| 2,896,748 | McClintock | July 28, 1959 |
| 2,912,066 | Ellithorpe | Nov. 10, 1959 |

FOREIGN PATENTS

| | | |
|---|---|---|
| 637 | Great Britain | Feb. 20, 1873 |
| 3,308 | Great Britain | Feb. 15, 1895 |